(12) United States Patent
Arikawa et al.

(10) Patent No.: US 6,754,215 B1
(45) Date of Patent: Jun. 22, 2004

(54) PACKET SCHEDULING DEVICE (75) Inventors: Toshiaki Arikawa, Tokyo (JP); Motoo Nishihara, Tokyo (JP); Michio Masuda, Tokyo (JP)

(73) Assignee: NEC Corporation, Tokyo (JP)

( * ) Notice: Subject to any disclaimer, the term of this patent is extended or adjusted under 35 U.S.C. 154(b) by 743 days.

(21) Appl. No.: 09/638,878

(22) Filed: Aug. 15, 2000

(30) Foreign Application Priority Data

Aug. 17, 1999 (JP) .......................................... 11-230369

(51) Int. Cl.$^7$ .............................................. H04L 12/56
(52) U.S. Cl. .............................. 370/395.4; 370/395.42
(58) Field of Search .......................... 370/395.4, 395.1, 370/389, 395.41, 395.42, 395.43

(56) References Cited

U.S. PATENT DOCUMENTS

| | | | |
|---|---|---|---|
| 6,262,986 B1 * | 7/2001 | Oba et al. .................... | 370/399 |
| 6,430,156 B1 * | 8/2002 | Park et al. ................... | 370/232 |
| 6,519,259 B1 * | 2/2003 | Baker et al. ............. | 370/395.4 |
| 6,614,790 B1 * | 9/2003 | Verses et al. ............ | 370/395.2 |

FOREIGN PATENT DOCUMENTS

| | | |
|---|---|---|
| JP | A 5-502776 | 5/1993 |
| JP | 10-84383 | 3/1998 |
| JP | 11-68770 | 3/1999 |
| JP | A 2002-507366 | 3/2002 |
| WO | 99/00949 | 1/1999 |

OTHER PUBLICATIONS

Hidetoshi Yokota et al., "Proposal for Round–Robin Packet Scheduling for Variable–Length Packets," Proceedings of the 1998 IEICE General Conference, Communication 2, The Institute of Electronics, Information and Communication Engineers, p. 200.

* cited by examiner

*Primary Examiner*—Kenneth Vanderpuye
(74) *Attorney, Agent, or Firm*—Young & Thompson (57) ABSTRACT

In the packet scheduling device, the output class selection part is made to conduct the selective output of priority class, based on the weight count value calculated from a weight value corresponding to minimum guarantee bandwidth for each priority class and the amount of packet accumulated in each queue. The output class selection part operates so that if the weight count value is "0" or more, then the packet length of variable-length packet data to be output is subtracted from the current weight count value to give a renewed weight count value. On the other hand, if the weight count value is less than "0", until reaching a predetermined repeat count (Cmax−1), the weight value of each priority class is added to the weight count value of all priority classes, and, when reaching the repeat count (Cmax−1), the weight value is added to the weight count value of all priority classes or replaced by half the weight value. Thereby, the weight count value is made to be more than "0", and the values thus renewed are subject to the rule of round robin so as to select the priority class.

6 Claims, 6 Drawing Sheets

PACKET SCHEDULING DEVICE

FIELD OF THE INVENTION

This invention relates to a packet scheduling device for conducting the scheduling of packet data, and more particularly to, a packet scheduling device for conducting efficiently the scheduling of variable-length packet data with multiple priority classes.

BACKGROUND OF THE INVENTION

Conventionally, in packet data networks, a variety of service classes are defined according to the kind of traffic, thereby the effective use of resources and the efficient data transfer in the network are achieved. For example, in the Internet service by Internet protocol (IP) there is less need to guarantee its quality of Service (QOS) such as network delay, but in general phone-call service there is need to guarantee the real-time performance. So, the optimum data transfer service of service class according to the kind of traffic is offered, thereby the optimum distribution of resource in the network is achieved.

The service class is defined as a priority class, for example, constant bit rate (CBR), real-time-variable bit rate (rt-VRB) or available bit rate (ABR). CBR is a service optimum to a traffic that requires the real-time performance to guarantee a constant bandwidth always. rt-VRB is a service suitable to a traffic that requires the real-time performance like CBR and the data transfer rate varies. ABR is a service for computer data transmission that does not require the real-time performance but no data loss in the network is allowed.

Users set in advance the priority class to each data flow. Each packet data is, in the packet data network, subject to the data transfer based on requirements such as QOS etc. concerning data discard rate or in-network delay defined according to the each set priority class.

To adapt to such traffic with a variety of priority classes, a packet scheduling device is placed at the post-stage of a packet switch or in the line. The packet scheduling device is provided with a buffer for each priority class, and outputs packet data of each priority class based on a minimum guarantee bandwidth set previously. The packet scheduling in selecting packet data to be output from the buffer provided for each priority class is generally performed by weighted round robin (WRR).

In recent years, the Internet traffic due to the popularization of the Internet increases, therefore it is required to conduct the priority control by packet scheduling to a packet of transmission control protocol/Internet protocol (TCP/IP) used in the Internet. A variety of packet scheduling devices to conduct such priority control have been suggested.

Figure 1:
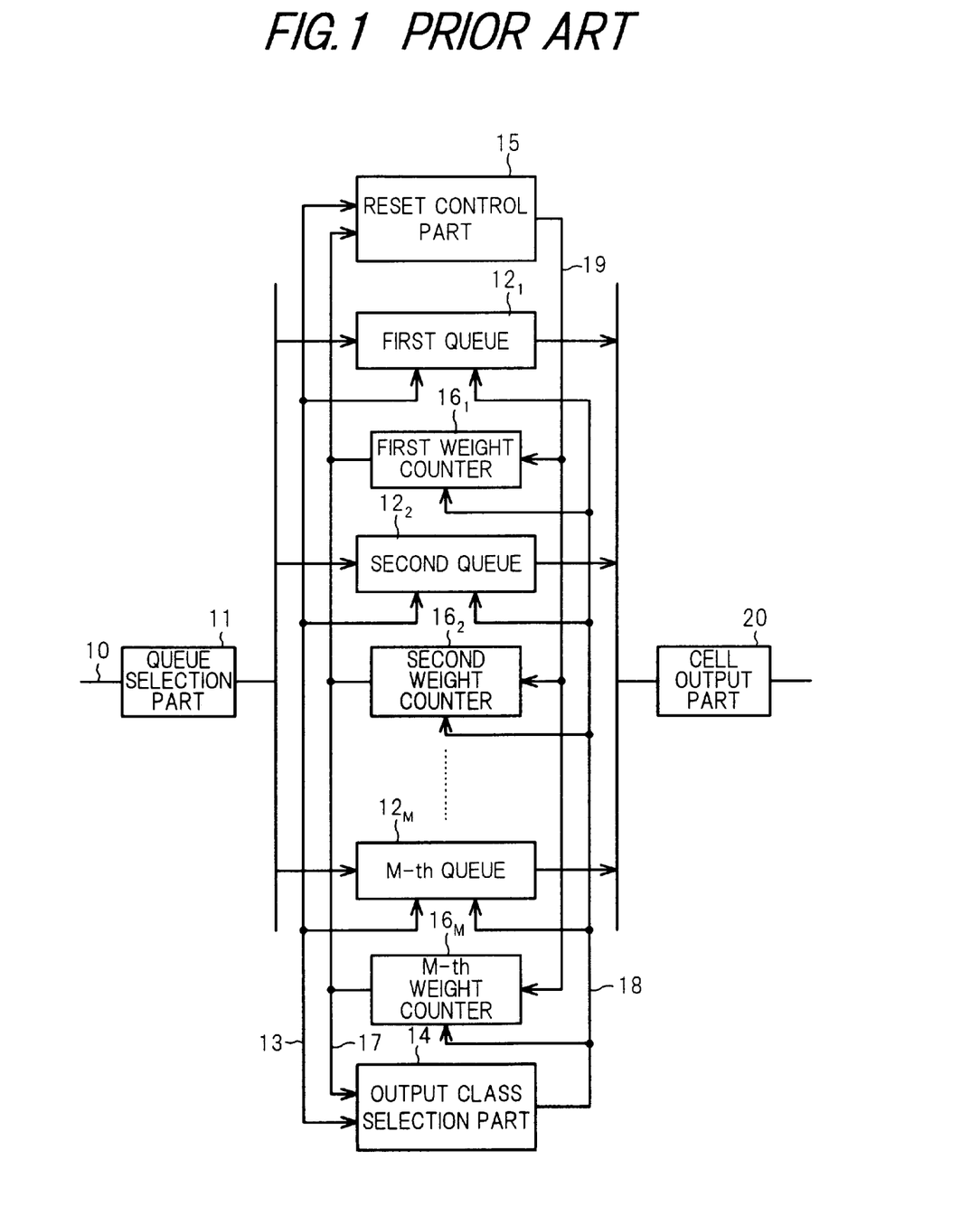
FIG. 1 is a block diagram showing the composition of the conventional packet scheduling device suggested.

FIG. 1 is a block diagram showing the composition of a conventional packet scheduling device suggested. This packet scheduling device guarantees the bandwidth of each priority class in asynchronous transfer mode (ATM) cell transfer service. In FIG. 1, an ATM cell to the packet scheduling device is input to a queue selection part 11. The ATM cell input is in advance provided with an identifier to indicate the priority class to the header. The queue selection part 11 refers to the header, selects any one of first to M-th queues $12_1$ to $12_M$ provided for each priority class to buffer multiple ATM cells, stores the input ATM cell 10 therein.

From each of the first to M-th queues $12_1$ to $12_M$, queue length notification signal 13 to indicate the number of ATM cell accumulated is input to an output class selection part 14 and a reset control part 15. Also, first to M-th weight counters $16_1$ to $16_M$ are provided for the first to M-th queues $12_1$ to $12_M$, respectively, and a weight value corresponding to a bandwidth required to the priority class is in advance set to each of the weight counters. From each of the first to M-th weight counters $16_1$ to $16_M$, a weight count value 17 as the count result is input to the output class selection part 14 and the reset control part 15.

The class selection part 14 monitors the queue length notification signal 13 from each queue and the weight count value 17 from each weight counter, selects a queue to output cell by the WRR scheduling while referring to priority that the priority class assigned to each queue is further classified into high-priority class or low-priority class. The class selection part 14 sends output allowance signal to the selected queue. The reset control part 15 also monitors the queue length notification signal 13 from each queue and the weight count value 17 from each weight counter, sends reset instruction signal 19 to each of the first to M-th weight counters $16_1$ to $16_M$ when the product of the queue length Qi and weight count value Wi of priority class i becomes "0" in all priority classes.

The queue receiving the output allowance signal 18 sent from the class selection part 14 reads its first-accumulated cell of ATM cells stored in the queue, sends it to a cell output part 20. The cell output part 20 outputs the cell to a post-stage device (not shown).

Figure 2:
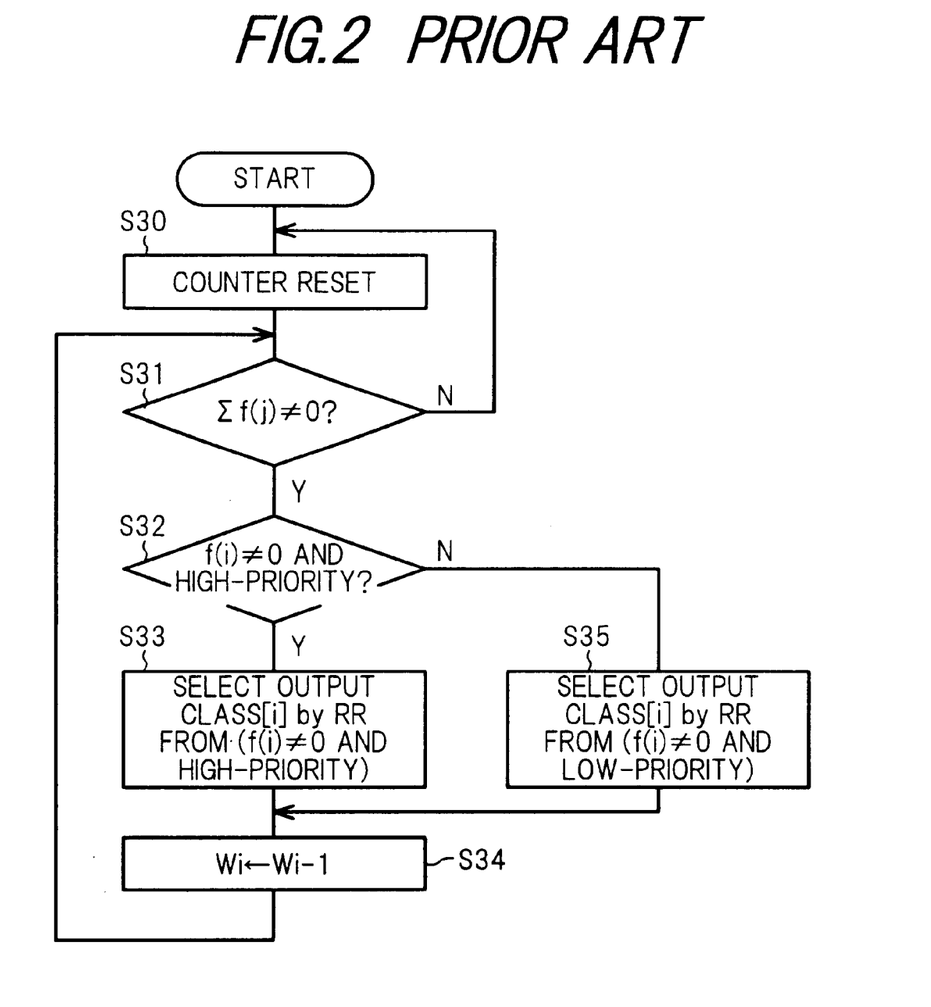
FIG. 2 is a flow chart showing schematically the WRR scheduling processing conducted by the conventional packet scheduling device.

FIG. 2 is a flow chart showing schematically the WRR scheduling processing conducted by this packet scheduling device. In FIG. 2, first, the weight count values set for the respective queues of the first to M-th weight counters $16_1$ to $16_M$ are reset, and a predetermined weight count value for each weight counter is set (step S30). Then, provided that f(i) is the product of queue length Qi and weight count value of each queue, it is judged, in all queues, whether f(i) is "0" or not (step S31). If in all queues f(i) is "0" (step S31:N), i.e. if the queue length Qi to indicate whether there exists a cell accumulated in the queue is "0", then returns to step S30.

On the other hand, if there exists any cell in any queue and therefore the weight count value Wi is not "0" (step S31:Y), then it is judged whether there exists a queue whose priority is classified into high-priority class in priority class with f(i) not "0", or not (step S32). If there exists a queue whose priority class is classified into high-priority class in priority class with f(i) not "0" (step S32:Y), then an output class is selected from the judged priority class by WRR (step S33), and the weight count value Wi of the weight counter corresponding to this queue is subtracted by "1" (step S34), then returns to step S31.

If there exists no queue whose priority class is classified into high-priority class in priority class with f(i) not "0" (step S32:N), then an output class is selected from the judged low-priority class by WRR (step S35), and the weight count value Wi of the weight counter corresponding to this queue is subtracted by "1" (step S34), then returns to step S31.

Then, the similar selection processing from step S31 to step S34 is repeated, when f(i) becomes "0" in all queues at step S31, the weight count values are reset and are initialized into a predetermined weight value.

Such a method for packet scheduling device is disclosed in, e.g., Japanese patent application laid-open No. 11-68770 (1999) titled "An ATM switch scheduling method". By the application of this method, an ATM cell can be output at a bandwidth guaranteed to each priority class according to a weight count value set to each priority class. Also, an ATM cell with high-priority class can be output preferentially without waiting for other ATM cell with low-priority class to be output. Therefore, the delay degradation of traffic in a priority class that requires its real-time performance can be avoided.

Also, Japanese patent application laid-open No. 10-84383 (1998) discloses a packet scheduling device that, as a scheduling key for storing scheduling information to indicate a flow target to be scheduled, one for a packet queue transmittable and one for a packet queue not transmittable are provided separately, and the transmission from the packet queue transmittable is allowed. Thereby, it can be avoided that a same flow continues to be selected until the corresponding counter to each queue becomes unable to make any decrement or a packet queue becomes empty.

However, in the method disclosed in Japanese patent application laid-open No. 11-68770, there is a problem that, due to no consideration of packet length, when the distribution of packet length varies according to priority class, the matching between the weight count value of each weight counter set as a value corresponding to the minimum guarantee bandwidth and the output bandwidth of each priority class may not be obtained. Especially when conducting the packet scheduling of variable-length packet data, it is difficult to determine each weight count value to be set in advance and, when the weight count value is too big, there occurs a problem about transfer delay. On the other hand, when the weight count value is too small, there occurs a problem that, even when there is no priority class to be an output candidate, subsequent packet data cannot be output since the weight count value is negative. Thus, it is difficult to select and output efficiently the variable-length packet data according to the minimum guarantee bandwidth.

In the method disclosed in Japanese patent application laid-open No. 10-84383, although variable-length packet data can be selected and output equally for each queue, to output efficiently variable-length packet data by priority control according to priority class is not disclosed nor suggested.

SUMMARY OF THE INVENTION

Accordingly, it is an object of the invention to provide a packet scheduling device that allows variable-length packet data to be selected and output efficiently according to its minimum guarantee bandwidth preset.

According to the invention defined by claim 1 attached herein, a packet scheduling device comprises:

a plurality of packet accumulating means for accumulating one or more variable-length packet with a preset priority class according to each the priority class;

a plurality of weight count means for renewing a weight count value as selection information of priority class every predetermined unit of selection processing, the weight count means being provided corresponding to the plurality of packet accumulating means;

a priority class selecting means for selecting one priority class from priority classes with the weight count value of zero or more in the selection processing according to the round robin to select equally in turn each priority class;

a selection processing repeat-count monitoring means for monitoring a repeat count of the unit of selection processing to be conducted for each priority class;

a renewal instructing means for instructing the plurality of weight count means to renew the weight count value for each priority class so as to allow the weight count value to have zero or more when the repeat count monitored by the selection processing repeat-count monitoring means reaches a predetermined value; and a packet reading means for reading a variable-length packet accumulated in one of the packet accumulating means corresponding to the priority class selected by the priority class selecting means.

Namely, in the invention defined in claim 1, corresponding to the plurality of packet accumulating means for accumulating multiple variable-length packets with a preset priority class according to said each priority class, the plurality of weight count means for renewing a weight count value as selection information of priority class every predetermined unit of selection processing are provided. One priority class is equally selected from priority classes with the weight count value, as selection information of priority class, of zero or more in the predetermined unit of selection processing according to the round robin to select equally in turn each priority class. However, since a priority class is left out of the selection target if its weight count value is less than "0", when the unit of selection processing reaches a predetermined repeat count, the weight count value of all priority classes is renewed so that the weight count value becomes "0" or more. Selecting thus the priority class, the variable-length packet from the corresponding packet accumulating means to the priority class is read by the packet reading means.

According to the invention defined by claim 2 attached herein, a packet scheduling device comprises:

a plurality of packet accumulating means for accumulating one or more variable-length packet with a preset priority class according to the each priority class;

a plurality of weight count means for renewing a weight count value by subtracting a length of variable-length packet when the packet accumulating means output a variable-length packet, and for renewing the weight count value based on a weight value corresponding to minimum guarantee bandwidth of the priority class according to a predetermined renewal instruction signal, the weight count means being provided corresponding to the plurality of packet accumulating means;

a selection processing repeat-count monitoring means for monitoring a repeat count of the unit of selection processing to be conducted for each priority class;

a priority class selecting means for selecting one priority class from priority classes with the weight count value of zero or more in the selection processing according to the round robin to select equally in turn each priority class;

a renewal instructing means for instructing all the plurality of weight count means to renew the weight count value for each priority class so as to allow the weight count value to have a value determined based on the weight value set for each priority class when the repeat count monitored by the selection processing repeat-count monitoring means reaches a predetermined value and the renewed weight count value is less than zero; and a packet reading means for reading a variable-length packet accumulated in one of the packet accumulating means corresponding to the priority class selected by the priority class selecting means.

Namely, in the invention defined in claim 2, the weight count value is renewed to have a value determined based on the weight value set for each priority class corresponding to the minimum guarantee bandwidth when the repeat count of selection processing reaches a predetermined value and the renewed weight count value is less than zero.

According to the invention defined by claim 3 attached herein, in the packet scheduling device defined by claim 2, the renewal instructing means instructs all the plurality of weight count means to renew the weight count value for each priority class so as to allow the weight count value to have a value of zero or more that is selectable by the priority class selecting means when the repeat count monitored by the selection processing repeat-count monitoring means reaches a predetermined value and the renewed weight count value is less than zero.

Namely, in the invention defined by claim 3, the weight count value is renewed to have a value, which is selectable by the priority class selecting means, set corresponding to the minimum guarantee bandwidth when the repeat count of selection processing reaches a predetermined value and the renewed weight count value is less than zero. Therefore, the selection of priority class can be conducted again by the very simple composition. Thus, the packet scheduling device that the priority class is selected efficiently according to the minimum guarantee bandwidth can be constructed.

According to the invention defined by claim 4 attached herein, the packet scheduling device defined by claim 2 further comprises:

a priority class identifying means for identifying a priority class based on priority class information added in advance to a variable-length packet and for storing the packet into the corresponding packet accumulating means;

wherein the plurality weight count means renews a weight count value by subtracting a length of variable-length packet recognized from packet length information added in advance to a variable-length packet accumulated in corresponding one of the packet accumulating means.

Namely, in the invention defined by claim 4, since information about priority class and packet length, which varies depending on packets, of variable-length packet is directly recognized from additional information of packet, the high-speed processing can be offered by a hardware-formed component.

According to the invention defined by claim 5 or 6 attached herein, the packet scheduling device defined by claim 1 or 2 further comprises:

a repeat-count setting means for setting the predetermined value as a maximum value of the selection processing repeat count.

Namely, in the invention defined by claims 5 and 6, at the maximum value of the selection processing repeat count, the selection of priority class is finished. Therefore, when the selection processing is conducted using a hardware-formed component, the maximum time required for one selection processing can be determined by the maximum repeat count of selection processing. Thus, by varying suitably the maximum repeat count of selection processing according to, for example, gate delay or system-required processing time in LSI (large scale integrated circuit) or large-scale PLD such as FPGA (field programmable gate array), the packet scheduling device using optimally the hardware resource can be constructed.

BRIEF DESCRIPTION OF THE DRAWINGS

The invention will be explained in more detail in conjunction with the appended drawings, wherein.

DESCRIPTION OF THE PREFERRED EMBODIMENTS

The preferred embodiment of the invention will be explained below.

Figure 3:
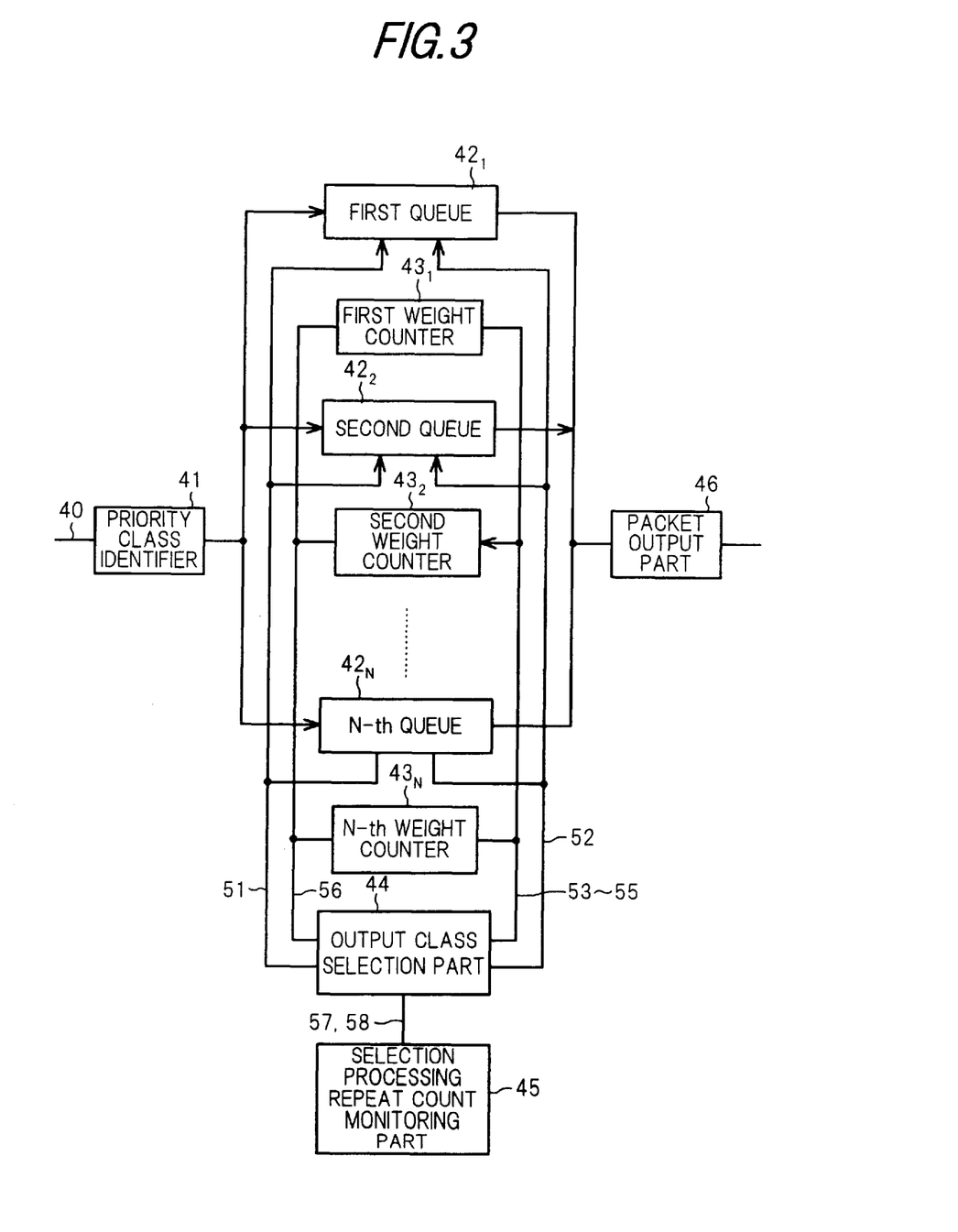
FIG. 3 is a block diagram showing the composition of a packet scheduling device in a preferred embodiment according to the invention.

FIG. 3 is a block diagram showing the composition of a packet scheduling device in the preferred embodiment according to the invention. The packet scheduling device in the embodiment guarantees the bandwidth of each priority class in variable-length packet data transfer service. The packet scheduling device is composed of a priority class identification part 41 to identify the priority class of variable-length packet data 40 input, first to N-th queues $42_1$ to $42_N$ to accumulate one or multiple variable-length packet data for each priority class, and first to N-th weight counters $43_1$ to $43_N$ to count a weight count value to be managed at each queue corresponding to each of the queues.

Furthermore, the packet scheduling device is composed of an output class selection part 44 to monitor the amount of packet accumulated in each queue and the weight count value and to select a priority class, a selection processing repeat-count monitoring part 45 to monitor a repeat count of priority class selection processing by the output class selection part 44, and a packet output part 46 to read packet data from the queue of priority class selected by the output class selection part 44 and to output it to an external device (not shown).

The priority class identification part 41 monitors variable-length packet data 40 input, identifies the priority class.

Figure 4A:
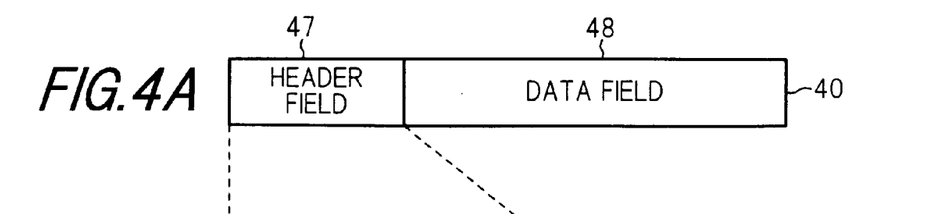
FIG. 4 is an illustration showing an example of composition of variable-length packet data in the embodiment.
Figure 4B:
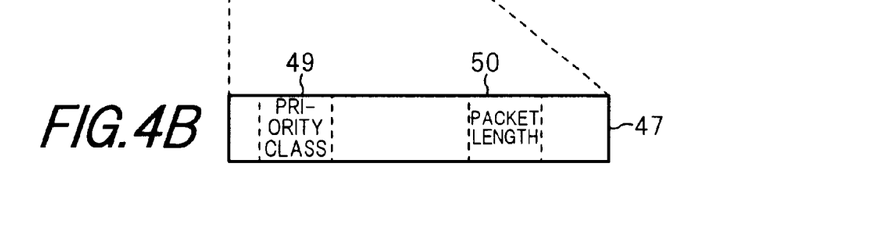

FIG. 4 shows an example of composition of variable-length packet data to be input to the priority class identification part 41. In FIG. 4, (a) is an example of format composition of variable-length packet data, and (b) is an example of format composition of header field in variable-length packet data. Variable-length packet data 40 is, as shown in FIG. 4(a), a header field 47 in which control information for transfer control in the packet data network is placed, and a data field 48 in which transfer data is placed. The header field 47 is, as shown in FIG. 4(b), composed of priority-class information 49 to identify the priority class and packet-length information 50 to indicate the packet length of the variable-length packet data 40 which are placed at predetermined positions.

The priority class identification part 41 refers to an identifier placed at the predetermined position of variable-length packet data, thereby it can identify the priority class of packet data. The packet data identified is sent to the first to N-th queues $42_1$ to $42_N$ assigned in advance to each priority class.

Each of the first to N-th queues $42_1$ to $42_N$ is composed of a FIFO (first-in first-out) memory to accumulate temporarily one or multiple variable-length packet data for each priority class, and a packet counter to manage the amount of packet accumulated in the FIFO memory. Each packet counter is able to identify the length of packet input by referring to the identifier to indicate the packet length as shown in FIG. 4(b) every time a packet assigned by the priority class identification part 41 is stored in the FIFO memory, thereby recognizing the amount of packet accumulated in the FIFO memory. The first to N-th queues $42_1$ to $42_N$ each output packet amount notification signal 51 to indicate the amount of the accumulated packet recognized to the output class selection part 44. Also, to each of the first to N-th queues $42_1$ to $42_N$, output instruction signal 52 is input from the output class selection part 44. A queue receiving this signal reads its variable-length packet data from the FIFO memory, and outputs it to the packet output part 46.

Each of the first to N-th weight counters $43_1$ to $43_N$ manages a weight value corresponding to a minimum guarantee bandwidth of each priority class predetermined in advance, and conducts the renewal of weight count value, which is information for determining from which class a packet data is read out, according to some kinds of instructions from the output class selection part 44.

If each of the first to N-th weight counters $43_1$ to $43_N$ receives selection instruction signal 53 to indicate that it is selected as the priority class to be output to the packet output part 46 from the output class selection part 44, then it subtracts the length of packet to be read from the currently-retained weight count value, and determines the result as a renewed weight count value. Also, if it receives addition instruction signal 54 from the output class selection part 44, then it adds a predetermined weight value of each priority class to the currently-retained weight count value, and determines the result as a renewed weight count value. Further, if it receives set instruction signal 55 from the output class selection part 44, then it adds a predetermined weight value of each priority class to the currently-retained weight count value, and determines the result as a renewed weight count value, and if the renewed weight count value is less than "0", then it determines half the weight value as the renewed weight count value, further if the renewed weight count value is more than a predetermined upper limit value, then it determines the upper limit value as the renewed weight count value. Here, the reason why half the weight value is determined as the renewed weight count value when the renewed weight count value is less than "0" is that, when the limitation of repeat count of selection processing is not set, the weight count value to be renewed from a negative value to a positive value takes a value between "0" and the weight value, i.e. half of the weight value in average. These weight count values 56 renewed by the respective weight counters are communicated to the output class selection part 44.

The output class selection part 44 selects a priority class to output packet from the queues of the respective priority classes, based on packet amount notification signal 51 to indicate the amount of packet accumulated in the first to N-th queues $42_1$ to $42_N$, respectively, and the weight count value 56 of the first to N-th weight counters $43_1$ to $43_N$, respectively.

Namely, the output class selection part 44 selects a priority class from priority classes that the length of queue accumulated in each queue to be notified by packet amount notification signal 51 is not "0" and the weight count value of the corresponding weight counter is more than "0", according to the rule of round robin that selects in turn equally the respective priority classes. If there exists only class with a weight count value less than "0" in priority class with a queue length of not "0", then the renewal of weight count value mentioned above is conducted by each of the weight counters depending on the repeat count of priority class selection processing to be monitored by the selection processing repeat-count monitoring part 45.

In the selection processing repeat-count monitoring part 45, a maximum value of repeat count of selection processing is set in advance. The selection processing repeat-count monitoring part 45 monitors a repeat count 57 of selection processing, and when this repeat count becomes equal to (the maximum value of repeat count of selection processing–1), it outputs count detection signal 58 to the output class selection part 44.

Until the count detection signal 58 is communicated from the selection processing repeat-count monitoring part 45, the output class selection part 44 repeats the priority class selection processing as well as outputting addition instruction signal 54 to instruct all priority classes to add the weight value predetermined for each priority class to the weight count value. However, when the count detection signal 58 is communicated from the selection processing repeat-count monitoring part 45, the output class selection part 44 adds the corresponding weight value to each priority class to the weight count value of all priority classes or renews the weight count value by half the weight value so that the weight count value of priority class becomes more than "0". Thus, by controlling the weight count value of each weight counter to be more than "0", the packet scheduling can select the priority class according to the rule of round robin.

The result of the selection of priority class by the output class selection part 44 is output as output instruction signal 52 to the corresponding queue to the priority class, and is output as selection instruction signal 53 to the corresponding weight counter to the priority class. Packet read from the queue receiving the output instruction signal 52 is output from the packet output part 46 to the external device (not shown).

The output class selection part 44 and the selection processing repeat-count monitoring part 45 that control the selection processing of priority class as mentioned above are controlled by a CPU (central processing unit) (not shown), and are allowed to conduct the selection processing of priority class as mentioned above based on a control program stored in a given storage device such as ROM (read-only memory).

Figure 5:
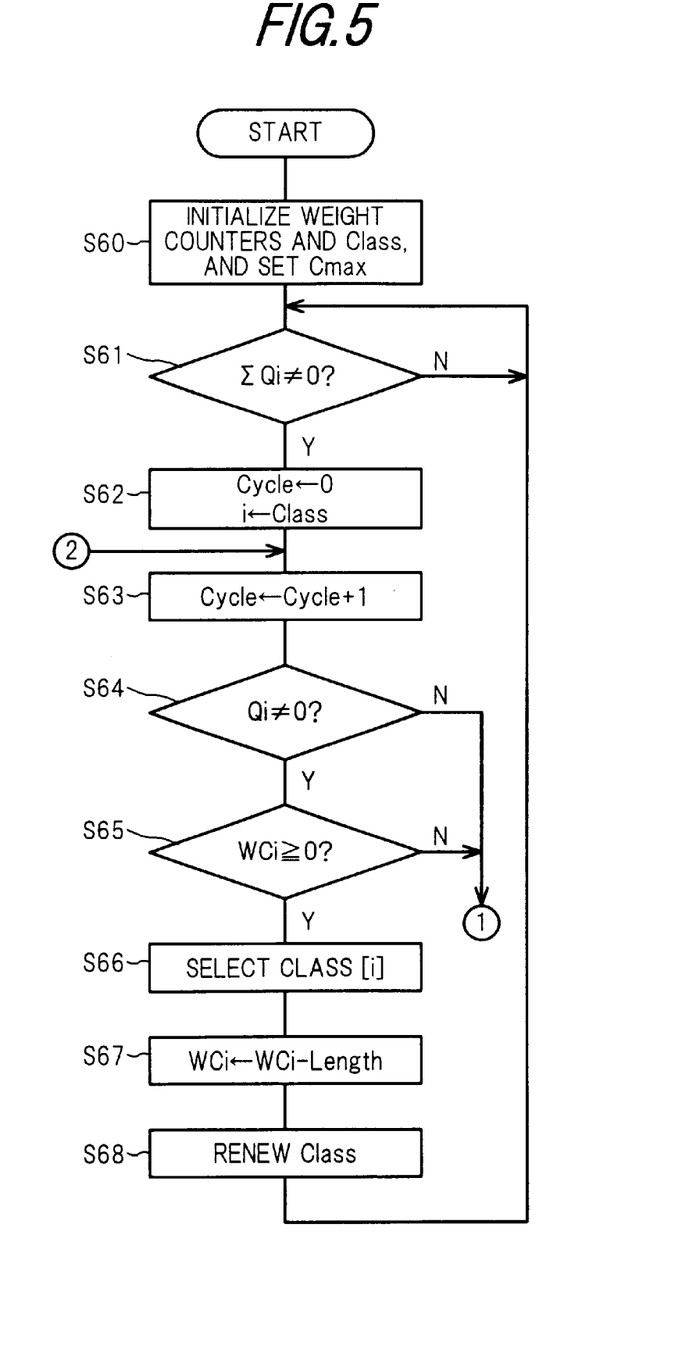
FIG. 5 is a flow chart showing the first half of contents of the selection processing of priority class in the embodiment.
Figure 6:
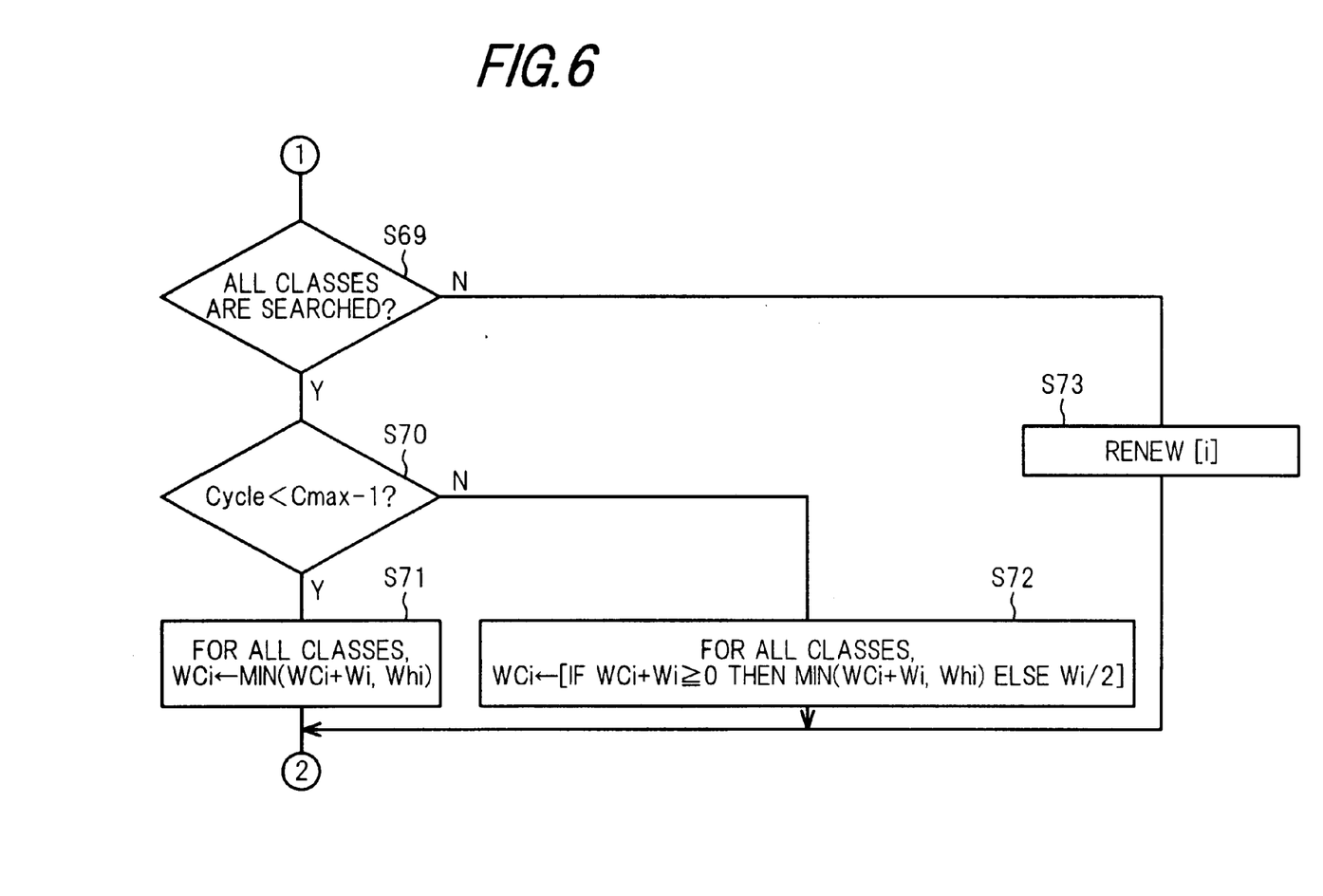
FIG. 6 is a flow chart showing the last half of contents of the selection processing of priority class in the embodiment.

FIGS. 5 and 6 show the schematic content of the program to control the selection processing of priority class stored in the given storage device. In FIG. 5, at first, all the first to N-th weight counters $43_1$ to $43_N$ provided for the respective priority classes, selection class parameter Class retained by the output class selection part 44, and the maximum value Cmax of repeat count of priority class selection processing are initialized (step S60). Namely, the output class selection part 44 instructs the first to N-th weight counters $43_1$ to $43_N$ to set the weight value corresponding to the minimum guarantee bandwidth predetermined for each priority class. Also, the output class selection part 44 assigns a predetermined initial value to the selection class parameter Class that is an internal parameter. Further, it assigns a given maximum value Cmax of repeat count of priority class selection processing to the selection processing repeat-count monitoring part 45.

The weight value and maximum value Cmax each are stored at a separate area from that of the concerned program in the storage device, and are allowed to be set to arbitrary values by altering the weight value stored.

Hereinafter, for convenience of explanation, a weight value of priority class i (i=0 to N) is represented by Wi, an amount of packet accumulated in i-th queue 42i corresponding to priority class i is represented by Qi, a weight count value of i-th weight counter 43i corresponding to priority class i is represented by Wci, and an upper-limit weight value of priority class i is represented by Whi.

Subsequent to step S60, it is judged whether any packet is accumulated in the queue of each priority class or not by referring to packet amount notification signal 51 from each queue (step S61). If it is judged that no packet is accumulated in the queue of each priority class (step S61:N), since it is impossible to output packet data, step S61 is repeated until packet is accumulated in any queue of each priority class.

On the other hand, at step S61, if it is judged that any packet is accumulated in the queue of one or more priority class (step S61:Y), then it is recognized that it is possible to output packet data, and a value of selection class parameter Class is assigned to internal parameter i to indicate a selection candidate of priority class in the output class selection part 44 and "0" is assigned to internal parameter Cycle to indicate a repeat count of priority class selection processing in the output class selection part 44. Thus, the parameters are initialized (step S62).

Then, the repeat count Cycle of selection processing is subject to increment (step S63), and it is judged whether any packet is accumulated in i-th queue 42i of priority class selection candidate i or not (step S64).

If at step S64 any packet is accumulated in the i-th queue 42i of priority class selection candidate i(step S64:Y), then it is judged whether weight count value WCi of i-th weight counter 43i of priority class selection candidate i is "0" or more or not (step S65).

If is judged that the weight count value WCi of i-th weight counter 43i of priority class selection candidate i is "0" or more (step S65:Y), then the selection of selection candidate i is determined (step S66). Namely, from the output class selection part 44, output instruction signal 52 is output to the i-th queue 42i of priority class i and selection instruction signal 53 is output to the i-th weight counter 43i of priority class i. By this output instruction signal 52, only one packet is read from the i-th queue 42i and is then output through the packet output part 46 to the external device (not shown). Also, by selection instruction signal 53, the i-th weight counter 43i is made to subtract packet length Length informed from the i-th queue from the current weight count value WCi, thereby a renewed weight count value is given (step S67).

Then, according to the rule of round robin, the selection class parameter Class to indicate the priority class is renewed, and, returning to step S61, the priority class selection processing is repeated again using the renewed priority class as a selection candidate (step S68).

If at step S64 it is judged that no packet is accumulated in the i-th queue 42i of priority class selection candidate i (step S64:N), or if at step S65 it is judged that the weight count value WCi of i-th weight counter 43i of priority class selection candidate i is less than "0" (step S65:N), then it is judged whether all priority classes have been searched or not (step S69 in FIG. 6).

If it is judged that all priority classes have been searched (step S69:Y), then the current repeat count Cycle of priority class selection processing is compared to (the maximum value Cmax of repeat count of priority class selection processing−1) (step S70).

Here, if the current repeat count Cycle of priority class selection processing is less than (the maximum value Cmax of repeat count of priority class selection processing−1) (step S70:Y), then addition instruction signal 54 is output from the output class selection part 44 to the weight counters of all priority classes. The first to N-th weight counters $43_1$ to $43_N$, respectively, receiving this addition instruction signal 54 add a predetermined weight value Wi to the current weight count value WCi. Further, a smaller one of this addition result and the predetermined upper limit Whi of weight value is determined as a renewed weight count value WCi (step S71). Namely, if the respective addition results are more than the predetermined upper limit Whi of weight value, then the upper limit Whi is determined as the renewed weight count value WCi, and if the addition results are less than the upper limit Whi, then the addition results are determined as the renewed weight count value WCi. Then, returning to step S63 again, the repeat count Cycle of selection processing is subject to increment, and the selection processing of priority class is conducted newly.

If at step S70 the repeat count Cycle of priority class selection processing is (the maximum value Cmax of repeat count of priority class selection processing−1) or more (step S70:N), then set instruction signal 55 is output from the output class selection part 44 to the weight counters of all priority classes. The first to N-th weight counters $43_1$ to $43_N$, respectively, receiving this set instruction signal 55 add the predetermined weight value Wi to the current weight count value WCi. Further, if this addition result is "0" or more, then a smaller one of the addition result and the predetermined upper limit Whi of weight value is determined as a renewed weight count value WCi. Namely, if the respective addition results are more than the predetermined upper limit Whi of weight value, then the upper limit Whi is determined as the renewed weight count value WCi, and if the addition results are less than the upper limit Whi, then the addition results are determined as the renewed weight count value WCi. Also, if the addition result is less than "0", then half the weight value is determined as the renewed weight count value (step S72). Then, returning to step S63 again, the repeat count Cycle of selection processing is subject to increment, and the selection processing of priority class is conducted newly. Meanwhile, the weight count value renewed when the addition result is less than "0" at step S72 may not be half the weight value. Alternatively, for example, another renewed weight count value may be set for each priority class or commonly for all priority classes, or a rate to the weight value may be set commonly for all priority classes.

If at step S69 it is judged that all priority classes have been not searched (step S69:N), then the priority class selection candidate i is renewed according to the rule of round robin, and returning to step S63 again, the repeat count Cycle of selection processing is subject to increment, and the selection processing of priority class is conducted newly.

As explained above, in the packet scheduling device in the embodiment, the first to N-th weight counters $43_1$ to $^{43}$N are provided corresponding to the first to N-th queues $42_1$ to $42_N$ for the respective priority classes, and the output class selection part 44 is made to conduct the selective output of priority class, based on the weight count value calculated from a weight value corresponding to minimum guarantee bandwidth for each priority class and the amount of packet accumulated in each queue. The output class selection part 44 operates so that if the weight count value of a queue where any packet is accumulated is "0" or more, then the packet length of variable-length packet data to be output is subtracted from the current weight count value to give a renewed weight count value, thereby lowering the priority order of priority class, and the selection processing of priority class is thus repeated in turn. On the other hand, if the weight count value of a queue where any packet is accumulated is less than "0", until reaching a predetermined repeat count, (Cmax−1), of priority class selection processing, the weight value of each priority class is added to the weight count value of the first to N-th weight counters $43_1$ to $43_N$ of all priority classes, and, when reaching the repeat count (Cmax−1), the weight value is added to the weight count value of all priority classes or replaced by half the weight value. Thereby, the weight count value is made to be more than "0", and the values thus renewed are subject to the rule of round robin so as to select the priority class.

Thus, when sufficient packet data are input to all priority classes, the packet can be output according to the rate of weight value corresponding to minimum guarantee bandwidth predetermined for each priority class. Further, even for a priority class where a packet very longer than the weight value is input, the packet data can be output only when there is no priority class to be a next selection candidate, therefore variable-length packet data can be selected and output efficiently according to the minimum guarantee bandwidth. Also, the selection of priority class can be finished at the predetermined maximum repeat count of priority class selection processing.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A packet scheduling device, comprising:

a plurality of packet accumulating means for accumulating one or more variable-length packets with a preset priority class corresponding to one of a plurality of priority classes;

a plurality of weight count means for renewing a weight count value every predetermined unit of selection processing, said weight count means being provided corresponding to said plurality of packet accumulating means, the weight count value being a priority class selection information;

a priority class selecting means for selecting one priority class from priority classes with said weight count value of zero or more in said selection processing according to a round robin to select equally in turn each priority class;

a selection processing repeat-count monitoring means for monitoring a repeat count of said unit of selection processing to be conducted for each priority class;

a renewal instructing means for instructing said plurality of weight count means to renew said weight count value for each priority class so as to allow said weight count value to have zero or more when the repeat count monitored by said unit of selection processing repeat-count monitoring means reaches a predetermined value; and a packet reading means for reading a variable-length packet accumulated in one of said packet accumulating means corresponding to the priority class selected by said priority class selecting means.

2. A packet scheduling device, comprising:

a plurality of packet accumulating means for accumulating one or more variable-length packets with a preset priority class corresponding to one of a plurality of priority classes;

a plurality of weight count means for renewing a weight count value by subtracting the length of a variable-length packet when said packet accumulating means outputs the variable-length packet, and for renewing the weight count value based on a weight value corresponding to minimum guarantee bandwidth of the priority class according to a predetermined renewal instruction signal, said weight count means being provided corresponding to said plurality of packet accumulating means;

a selection processing repeat-count monitoring means for monitoring a repeat count of a unit of selection processing to be conducted for each priority class;

a priority class selecting means for selecting one priority class from priority classes with said weight count value of zero or more in said unit of selection processing according to a round robin to select equally in turn each priority class;

a renewal instructing means for instructing all said plurality of weight count means to renew said weight count value for each priority class so as to allow said weight count value to have a value determined based on the weight value set for each priority class when the repeat count monitored by said selection processing repeat-count monitoring means reaches a predetermined value and the renewed weight count value is less than zero; and a packet reading means for reading a variable-length packet accumulated in one of said packet accumulating means corresponding to the priority class selected by said priority class selecting means.

3. A packet scheduling device, according to claim 2, wherein:

said renewal instructing means instructs all said plurality of weight count means to renew said weight count value for each priority class so as to allow said weight count value to have a value of zero or more that is selectable by said priority class selecting means when the repeat count monitored by said selection processing repeat-count monitoring means reaches a predetermined value and the renewed weight count value is less than zero.

4. A packet scheduling device, according to claim 2, further comprising:

a priority class identifying means for identifying a priority class based on priority class information added in advance to a variable-length packet and for storing the packet into said corresponding packet accumulating means;

wherein said plurality weight count means renews a weight count value by subtracting a length of variable-length packet recognized from packet length information added in advance to a variable-length packet accumulated in corresponding one of said packet accumulating means.

5. A packet scheduling device, according to claim 1, further comprising:

a repeat-count setting means for setting said predetermined value as a maximum value of said selection processing repeat count.

6. A packet scheduling device, according to claim 2, further comprising:

a repeat-count setting means for setting said predetermined value as a maximum value of said selection processing repeat count.

* * * * *